US010948912B2

(12) United States Patent
Lee

(10) Patent No.: US 10,948,912 B2
(45) Date of Patent: Mar. 16, 2021

(54) AUTOMATIC FOLLOWING SYSTEM AND METHOD

(71) Applicants: Passion Mobility Ltd., Taipei (TW); Chunghsin Lee, Las Vegas, NV (US)

(72) Inventor: Chunghsin Lee, Las Vegas, NV (US)

(73) Assignees: Passion Mobility Ltd., Taipei (TW); Chunghsin Lee, Las Vegas, NV (US)

(*) Notice: Subject to any disclaimer, the term of this patent is extended or adjusted under 35 U.S.C. 154(b) by 456 days.

(21) Appl. No.: 15/798,447

(22) Filed: Oct. 31, 2017

(65) Prior Publication Data

US 2019/0129419 A1    May 2, 2019

(51) Int. Cl.
| | | |
|---|---|---|
| *G05D 1/00* | (2006.01) |
| *G05D 1/02* | (2020.01) |
| *G01S 17/08* | (2006.01) |
| *G01S 13/08* | (2006.01) |
| *G01S 15/08* | (2006.01) |

(52) U.S. Cl.
CPC ......... *G05D 1/0088* (2013.01); *G05D 1/0223* (2013.01); *G05D 1/0246* (2013.01); *G05D 1/0261* (2013.01); *G05D 1/0263* (2013.01); *G01S 13/08* (2013.01); *G01S 15/08* (2013.01); *G01S 17/08* (2013.01); *G05D 2201/0216* (2013.01)

(58) Field of Classification Search
CPC ..... B60G 2600/0422; B60G 2800/166; B60W 2050/008; B60W 2050/048; B60Y 2300/165; B60Y 30/165; G01S 13/06; G01S 13/08; G01S 15/06; G01S 15/08; G01S 17/06; G01S 17/08; G01S 2013/9325; G05D 1/0088; G05D 1/02; G05D 1/0212; G05D 1/0223; G05D 1/0231; G05D 1/0246; G05D 1/0259; G05D 1/0261; G05D 1/0263; G05D 2201/02; G05D 2201/0216; G08G 1/22
See application file for complete search history.

(56) References Cited

U.S. PATENT DOCUMENTS

| | | | | |
|---|---|---|---|---|
| 6,211,798 | B1* | 4/2001 | Albrecht | G01C 21/3415 340/988 |
| 2009/0140887 | A1* | 6/2009 | Breed | G01S 17/86 340/990 |
| 2010/0256852 | A1* | 10/2010 | Mudalige | G08G 1/163 701/24 |
| 2016/0339914 | A1* | 11/2016 | Habu | B60W 30/12 |

* cited by examiner

*Primary Examiner* — Charles J Han
(74) *Attorney, Agent, or Firm* — Alan D. Kamrath; Karin L. Williams; Mayer & Williams PC

(57) ABSTRACT

A method for automatically following a preceding object by an autonomous vehicle is provided and includes the following steps: providing a first predetermined path, locating the preceding object and the autonomous vehicle on the first predetermined path, measuring the distance between the autonomous vehicle and the preceding object by a distance measuring unit disposed on the autonomous vehicle, determining a predetermined distance to be maintained between the autonomous vehicle and the preceding object through a central processor, and when the preceding object moves along the first predetermined path, the central processor drives the autonomous vehicle to be following the preceding object along the first predetermined path with the predetermined distance and a moving velocity.

4 Claims, 11 Drawing Sheets

AUTOMATIC FOLLOWING SYSTEM AND METHOD

FIELD OF THE INVENTION

The present invention relates to an automatic following system and method, and more particularly to an automatic following system and method that are capable of driving an autonomous vehicle to follow a preceding object along a labeled path.

BACKGROUND OF THE INVENTION

Automatic guided vehicles (AGVs) have been used extensively in warehouses and manufacturing floors for a long period of time. These automatic guided vehicles are often navigated by various types of automatic tracing methods, such as being positioned and guided by Global Positioning System (GPS) while operating in outdoor environments, or by tracing pre-existing markers set on the floor, the ceiling or the wall during indoor operations, such as using magnetic tapes embedded in the floor, adhesive tapes or paint strips laid out on the floor or, alternatively, by using infrared light beams or other markings attached to the floor. The automatic guided vehicles follow these markings and travel along designated directions as driven by the computer systems installed inside the vehicles.

However, even though these AGV systems are quite reliable to move cargo around the warehouse or the manufacturing floor along predetermined pathways to its destinations, it is not configured to be stopped randomly by the operators at will. As a result, if an operator, i.e. user, neglects the AGV moving toward himself, the AGV may be collided with the operator and may cause serious injuries. This is especially the case for workers to stock the new parts onto the shelf or to take customer ordered parts from the shelf in warehouse or stockroom environment. Hence, a new AGV system for the operator to control the stop and go of these AGV's without actively pressing any button or taking any action, i.e. an AGV system that is capable of automatically following its preceding operator depending on the distance from the operator is strongly demanded.

SUMMARY OF THE INVENTION

Therefore, in the following of the present disclosure, an automatic following system and method of autonomous vehicles that moves depending on the speed or the distance of its respective preceding operators are provided.

An aspect of the present invention is to provide a method for automatically following a preceding object by an autonomous vehicle. The method includes the following steps: providing a first predetermined path; locating the preceding object and the autonomous vehicle on the first predetermined path; measuring the distance between the autonomous vehicle and the preceding object by a distance measuring unit disposed on the autonomous vehicle; determining a predetermined distance to be maintained between the autonomous vehicle and the preceding object through a central processor; and when the preceding object moves along the first predetermined path, the central processor drives the autonomous vehicle to be following the preceding object along the first predetermined path with the predetermined distance and a moving velocity.

Another aspect of the present invention is to provide an automatic following system of an autonomous vehicle capable of following a preceding object along a first predetermined path. The automatic following system includes a central processor, a tracing unit, and a distance measuring unit. The central processor is installed in the autonomous vehicle. The tracing unit is disposed on the autonomous vehicle and connected to the central processor, and the tracing unit is also adapted to be constantly tracing the first predetermined path. The distance measuring unit is disposed on the autonomous vehicle and connected to the central processor, the distance measuring unit is also adapted to be measuring the distance between the autonomous vehicle and the preceding object. When the preceding object moves along the first predetermined path, the central processor drives the autonomous vehicle to be following the preceding object along the predetermined path with a predetermined distance and a moving velocity, wherein the central processor drives the autonomous vehicle to remain static when the distance between the autonomous vehicle and the preceding object is shorter than the predetermined distance, and to speed up when the distance between the autonomous vehicle and the preceding object is greater than the predetermined distance.

Another aspect of the present invention is to provide an automatic following system of an autonomous vehicle capable of following a preceding object along a first predetermined path and a second predetermined path perpendicularly intersecting the first predetermined path, in which the preceding object and the autonomous vehicle are located on the first predetermined path or the second predetermined path. The automatic following system includes: a processor disposed on the autonomous vehicle and configured to perform the following steps: measuring the distance between the autonomous vehicle and the preceding object; determining a predetermined distance to be maintained between the autonomous vehicle and the preceding object; when the preceding object moves along the first predetermined path, the autonomous vehicle follows the preceding object along the first predetermined path with the predetermined distance and a moving velocity; and obtaining a deviation distance of the preceding object deviated from the first predetermined path when the preceding object moves to the second predetermined path from the first predetermined path, and when the deviation distance exceeds a deviation threshold, the autonomous vehicle determines that the preceding object has made a turn, and when the autonomous vehicle determines that the preceding object has made the turn, the autonomous vehicle makes the turn while reaching the intersection in order to keep following the preceding object along the second predetermined path.

Another aspect of the present invention is to provide a tracking system that includes a following object and an autonomous vehicle. The autonomous vehicle travels on a first predetermined path and is configured to be followed by the following object capable of traveling along the first predetermined path. The autonomous vehicle has a central processor disposed on the autonomous vehicle and configured to perform the following steps: determining whether the following object is in a detectable range, when the following object is not in the detectable range, the autonomous vehicle stops, and when the following object is in the detectable range, the processor measures the distance between the autonomous vehicle and the following object; determining a predetermined range of distance to be maintained between the autonomous vehicle and the following object, when the following object moves along the first predetermined path and the distance between the autonomous vehicle and the following object is shorter than the predetermined range of distance, the autonomous vehicle increases the moving velocity thereof to lengthen the distance therebetween, whereas when the following object moves along the first predetermined path and the distance between the autonomous vehicle and the following object is longer than the predetermined range of distance, the autonomous vehicle increases the moving velocity thereof to shorten the distance therebetween. If the following object moves along the first predetermined path and the distance between the autonomous vehicle and the following object is within the predetermined range of distance, the moving velocity is a predetermined fixed value.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
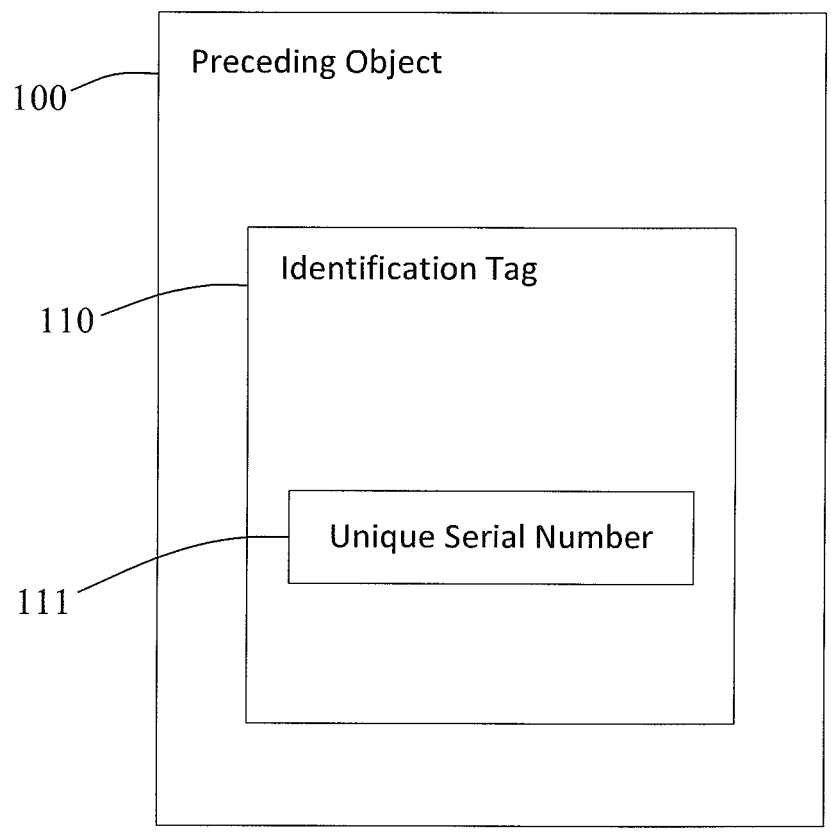
FIG. 1 is a functional block diagram illustrating a preceding object of an automatic following system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to threshold the method or the system by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that when an element is referred to as being "connected" to another element, it can be directly connected to the other element or intervening elements may be present.

Figure 2:
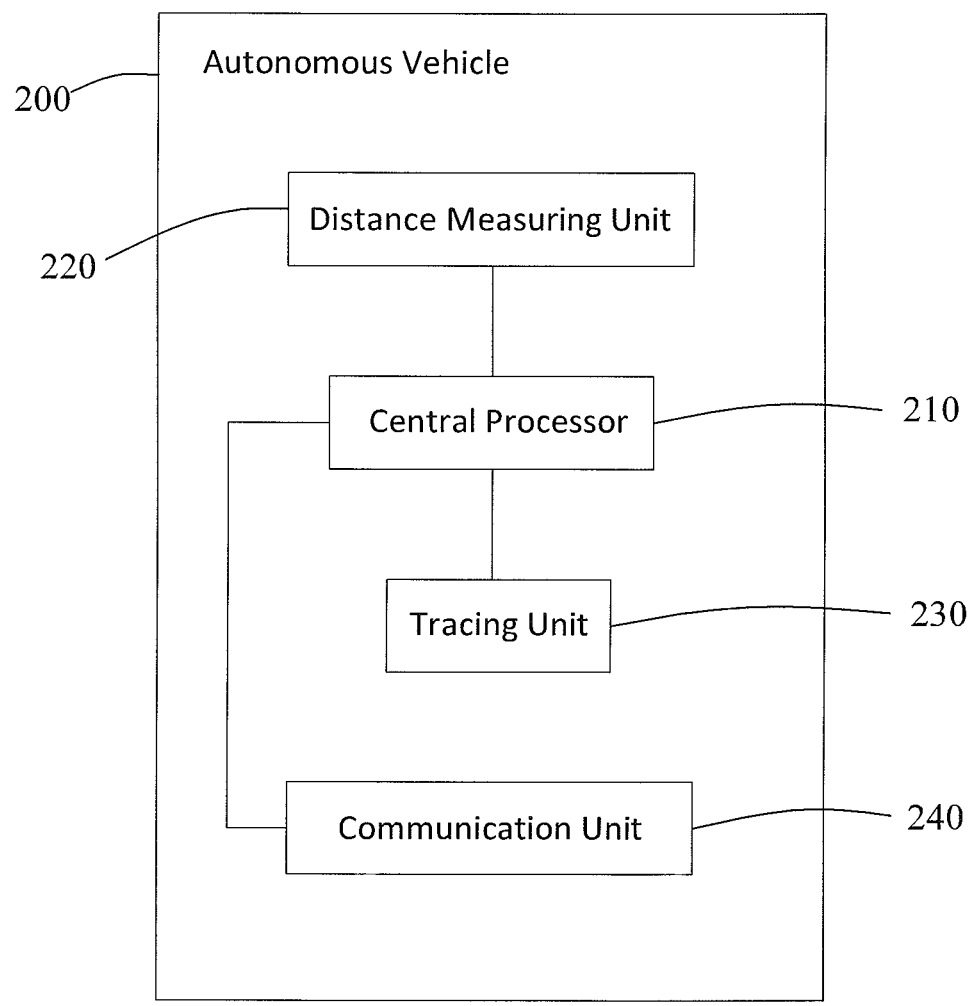
FIG. 2 is a functional block diagram illustrating an autonomous vehicle capable of following the preceding object of an automatic following system according to an embodiment of the present invention.

FIG. 1 is a functional block diagram illustrating a preceding object 100 of an automatic following system according to an embodiment of the present invention. FIG. 2 is a functional block diagram illustrating an autonomous vehicle 200 capable of following the preceding object 100 of an automatic following system according to an embodiment of the present invention. An aspect of the present invention is to provide an automatic following system, in which the automatic following system includes the preceding object 100 and the autonomous vehicle 200. The preceding object 100 includes an identification tag 110 disposed on the preceding object 100, in which the identification tag 110 includes a unique serial number 111 representing the identity of the identification tag 110. According to an embodiment of the present invention, the preceding object 100 may be any moving object capable of moving along a labeled path, for instance, a person, a vehicle, or another additional autonomous vehicle, and the identification tag 110 can be a radio frequency identification (RFID) tag disposed in the pocket of the person or disposed on the vehicles to be followed. However, the identification tag 110 also can be implemented by other long distance wireless sensor technologies.

The autonomous vehicle 200 includes a central processor 210, a distance measuring unit 220 connected to the central processor 210 and installed on a side of the autonomous vehicle 200 that is capable of detecting the preceding object 100, a tracing unit 230 connected to the central processor 210 and installed on a side of the autonomous vehicle 200 that is capable of detecting the labeled path, a communication unit 240 connected to the central processor 210 and capable of communicating with the identification tag 110 of the preceding object 100 in order to read the unique serial number 111 of the identification tag 110. The distance measuring unit 220 is adapted to be constantly measuring the distance between the autonomous vehicle 200 and the preceding object 100 and transmitting the data back to the central processor 210. Specifically, the distance between the autonomous vehicle 200 and the preceding object 100 can be obtained by the distance measuring unit 220 from calculating and summing the traveling path of a signal transmitted toward the preceding object 100, and the traveling path bounced back from the preceding object 100 to where the signal was transmitted. For instance, the distance measuring unit 220 may be a radar rangefinder, a laser rangefinder, or an ultrasonic 2D or 3D rangefinder. Alternatively, in some embodiments, the distance measuring unit 220 may also include a camera constantly taking images of the preceding object, and the distance between the autonomous vehicle 200 and the preceding object 100 can then be obtained by calculating the size changes of the preceding object 100 captured in the images. Additionally, the central processor 210 may include image processing functions in this instance. The tracing unit 230 is adapted to be constantly detecting the labeled path along a predetermined pathway and transmitting back the data to the central processor 210, in which the labeled path can have various types of which the tracing unit 230 is capable of detecting. According to an embodiment of the present invention, the tracing unit 230 can include a camera installed on the front of the autonomous vehicle 200 and connected to the central processor 210, and the labeled path can be formed of adhesive tape or painted strip. These labeled paths can be detected by processing a number of images of the labeled paths constantly captured by the camera. In some embodiments, the labeled path can be formed of magnetic strips, and in this case the tracing unit 230 can include a magnetic sensor installed on the autonomous vehicle 200. Such magnetic sensor is electronically connected to the central processor 210 and in order to be adapted to constantly and magnetically detect the magnetic strips along the pathway to be traveled. The detected signals are simultaneously sent to the central processor 210 in order to obtain the relative position with the magnetic strips. Regardless of the types of the tracing unit 230, the position of the autonomous vehicle 200 can be adjusted and calibrated along the labeled path according to the relative position with the labeled path by the central processor 210. The communication unit 240, as mentioned, is adapted to be communicating with the identification tag 110, where the communication unit 240 may be, for instance, an RFID reader having the unique serial number 111 of the identification tag 110 pre-registered, in order to recognize the identity of the preceding object 100.

Figure 3A:
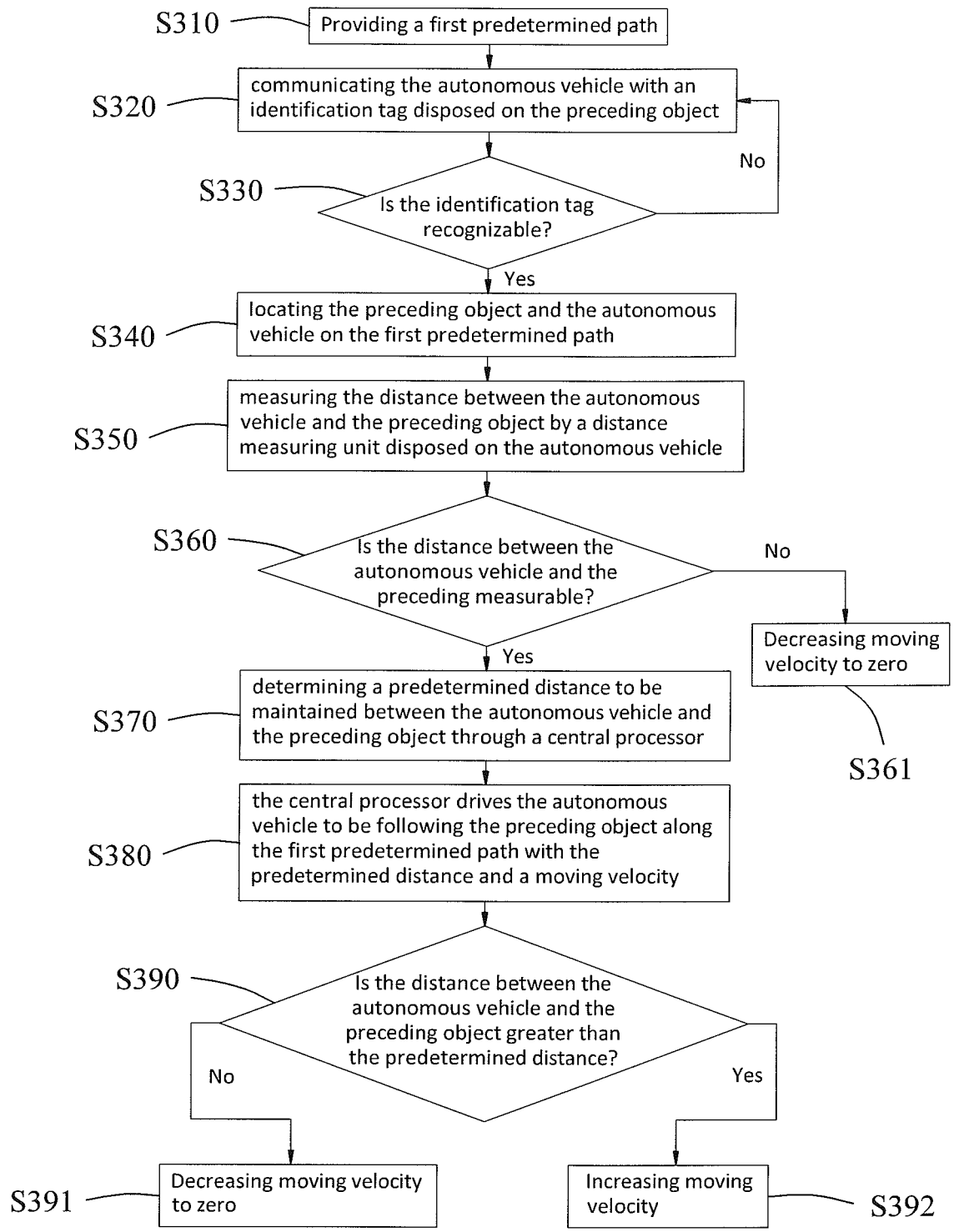
FIG. 3A is a flow chart illustrating a method for automatically following the preceding object by the autonomous vehicle according to an embodiment of the present invention.
Figure 3B:
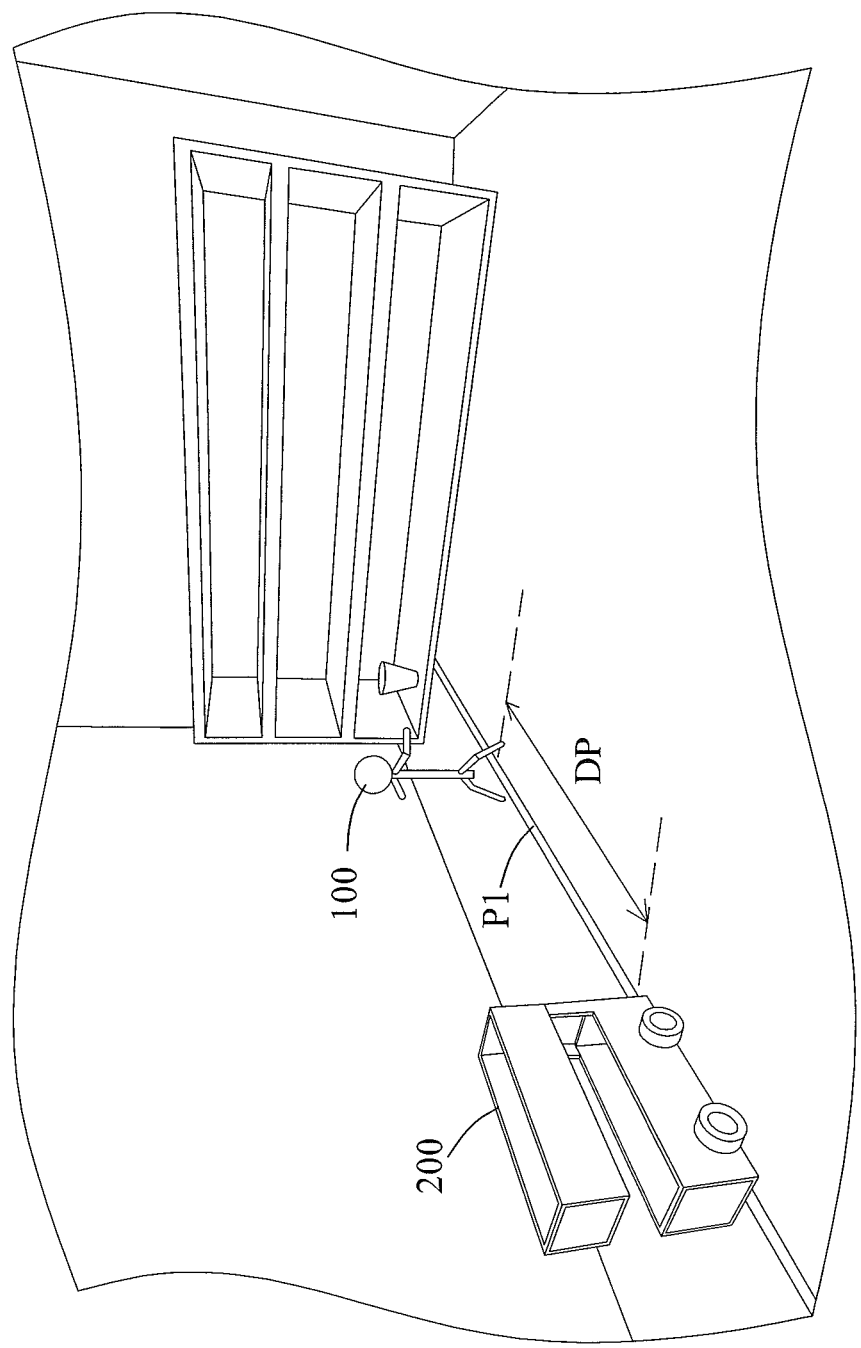
FIG. 3B is a schematic perspective view illustrating an environment while practicing the method of FIG. 3A according to an embodiment of the present invention.

Now with reference to FIGS. 3A and 3B, in which FIG. 3A is a flow chart illustrating a method for automatically following the preceding object 100 by the autonomous vehicle 200 according to an embodiment of the present invention, and FIG. 3B is a schematic perspective view illustrating an environment while practicing the method of FIG. 3A according to an embodiment of the present invention. In step S310, a first predetermined path P1, namely the labeled path mentioned above, is provided for locating the preceding object 100 and the autonomous vehicle 200. In step S320, the autonomous vehicle 200 will first be communicating with the identification tag 110 of the preceding object 100 through the communication unit 240, which has the unique serial number 111 of the identification tag 110 pre-registered, in order to make sure that the preceding object 100 intended to be followed exist, i.e. capable of being read by the communication unit 240. Meanwhile, in step S330, the central processor 210 determines whether the identification tag 110 has been detected through the communication unit 240, and, if detected, whether the unique serial number 111 of the identification tag 110 matches the one that was pre-registered in the communication unit 240, i.e. being recognizable by communication unit 240. If the identification tag 110 cannot be detected, or the unique serial number 111 of the identification tag 110 does not match with the one pre-registered in the communication unit 240, the process goes back to step S320 and the autonomous vehicle 200 awaits and performs no action until the identification tag 110 appears in its range of detection. Once the unique serial number 111 has been recognized by the communication unit 240, the process goes further to step S340, where both the preceding object 100 and the autonomous vehicle 200 are located on the first predetermined path P1. In step S350, the distance measuring unit 220 of the autonomous vehicle 200 measures the distance between the autonomous vehicle 200 and the preceding object 100 and send back the data to the central processor 210. Step S360, the central processor 210 determines whether the distance between the preceding object 100 and the autonomous vehicle 200 is measurable. When the distance between the autonomous vehicle 200 and the preceding object 100 cannot be measured (step S360), the moving velocity of the autonomous vehicle 200 will be reduced to (if moving) or remains zero (step S361). Once the distance between the autonomous vehicle 200 and the preceding object 100 is measured, it will be measured constantly at intervals. For instance, the frequency of the measurement of the distance can depend on the velocity the preceding object 100 moves. Alternatively, the distance can be measured at a fixed interval of time, such as 500 milliseconds or 1.25 seconds. In step S370, a predetermined distance DP intended to be maintained between the autonomous vehicle 200 and the preceding object 100 is determined through the central processor 210. More specifically, the predetermined distance DP may be a value preset into the central processor 210 by the user before the entire process has been initiated. While the above steps have been completed, step S380 will be performed, in which the following function of the autonomous vehicle 200 will be initiated and the autonomous vehicle 200 will start moving along the first predetermined path P1 by tracing its labels, i.e. the aforementioned adhesive tapes, painted strips, magnetic strips, etc., by the tracing unit 230. That is, when the preceding object 100 moves along the first predetermined path P1, the central processor 210 will drive the autonomous vehicle 200 to be following the preceding object 100 along the first predetermined path P1 with the predetermined distance DP and a moving velocity according to the data given by the tracing unit 230 and the distance measuring unit 220. In step S390, if the central processor 210 determines that the distance between the autonomous vehicle 200 and the preceding object 100 is shorter than the predetermined distance DP, the autonomous vehicle 200 stops or remains static if the autonomous vehicle 200 was not moving (step S391). Oppositely, when the distance between the autonomous vehicle 200 and the preceding object 100 is greater than the predetermined distance DP, the central processor 210 drives the autonomous vehicle 200 to increase its current moving velocity (step S392).

Figure 4:
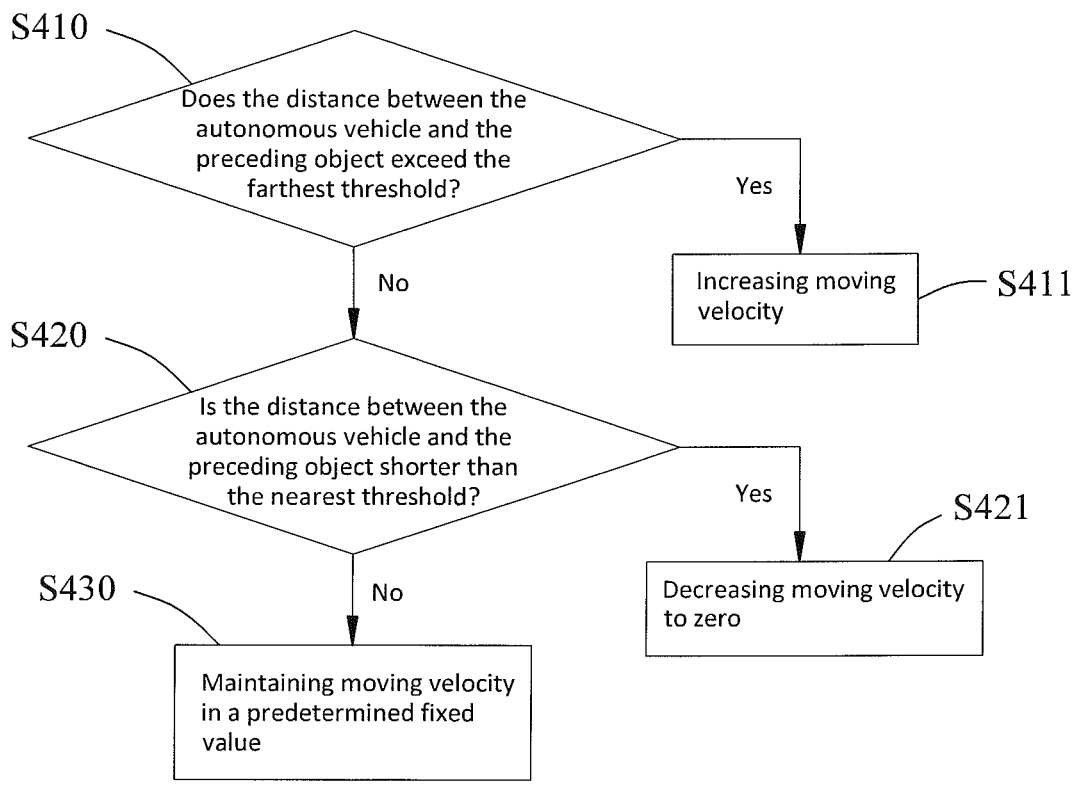
FIG. 4 is a flow chart illustrating how the central processor controls the autonomous vehicle to follow the preceding object according to another embodiment of the present invention.

FIG. 4 is a flow chart illustrating how the central processor 210 controls the autonomous vehicle 200 to follow the preceding object 100 according to another embodiment of the present invention. In such embodiment, the predetermined distance DP can be a range of value having a lower boundary, i.e. a nearest threshold, and an upper boundary, i.e. a farthest threshold greater than the nearest threshold. In step S410, the central processor 210 determines whether the distance between the autonomous vehicle 200 and the preceding object 100 is greater than the farthest threshold or smaller than the nearest threshold. If the distance between the autonomous vehicle 200 and the preceding object 100 exceeds the farthest threshold, the central processor 210 drives the autonomous vehicle 200 to increase its moving velocity in order to shorten the distance between the autonomous vehicle 200 and the preceding object 100 to be shorter than the farthest threshold (step S411). If the distance between the autonomous vehicle 200 and the preceding object 100 does not exceed the farthest threshold, step S420 will be performed, in which the central processor 210 will determine whether the distance between the autonomous vehicle 200 and the preceding object 100 is shorter than the predetermined distance DP along the first predetermined path P1. When the distance between the autonomous vehicle 200 and the preceding object 100 becomes shorter than the nearest threshold, the autonomous vehicle 200 decreases the moving velocity to zero in order to avoid collision between the autonomous vehicle 200 and the preceding object 100 (step S421). In the case that the distance between the autonomous vehicle 200 and the preceding object 100 is between the nearest threshold and the farthest threshold, the moving velocity can be a predetermined fixed value, where the predetermined fixed value can be preset through the central processor 210 (step S430) before the entire process has been initiated. For instance, the moving velocity may range from 5 kilometers per hour to 20 kilometers per hour. The steps from S410 to S430 can be applied to steps S390, S391, and S392 in the previous embodiment. In other words, while practicing the present invention, the steps from S390 to S392 are replaceable with the steps from S410 to S430 illustrated in this embodiment.

Figure 5A:
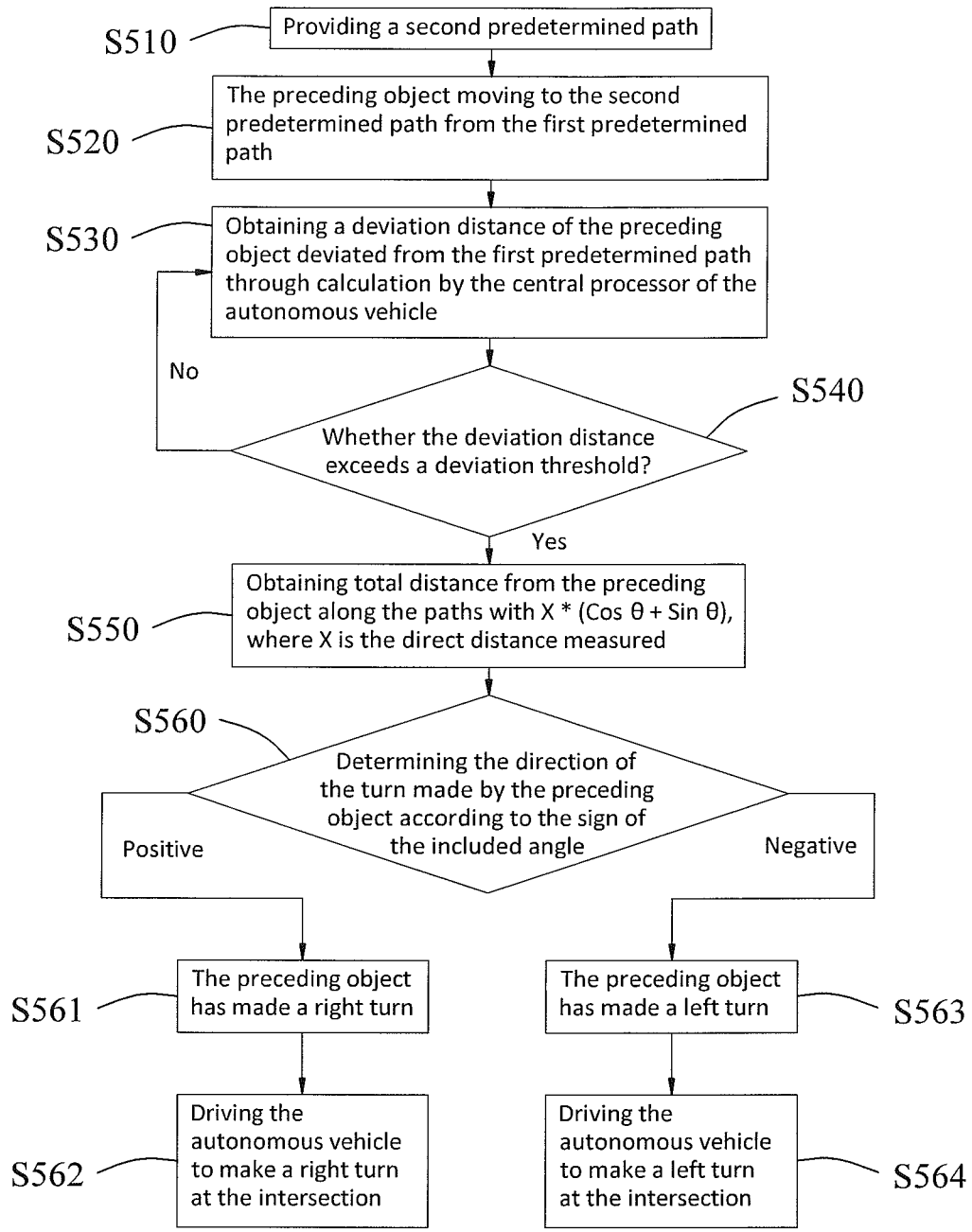
FIG. 5A is a flow chart illustrating the method for automatically following the preceding object by the autonomous vehicle operating with the second predetermined path according to an embodiment of the present invention.
Figure 5B:
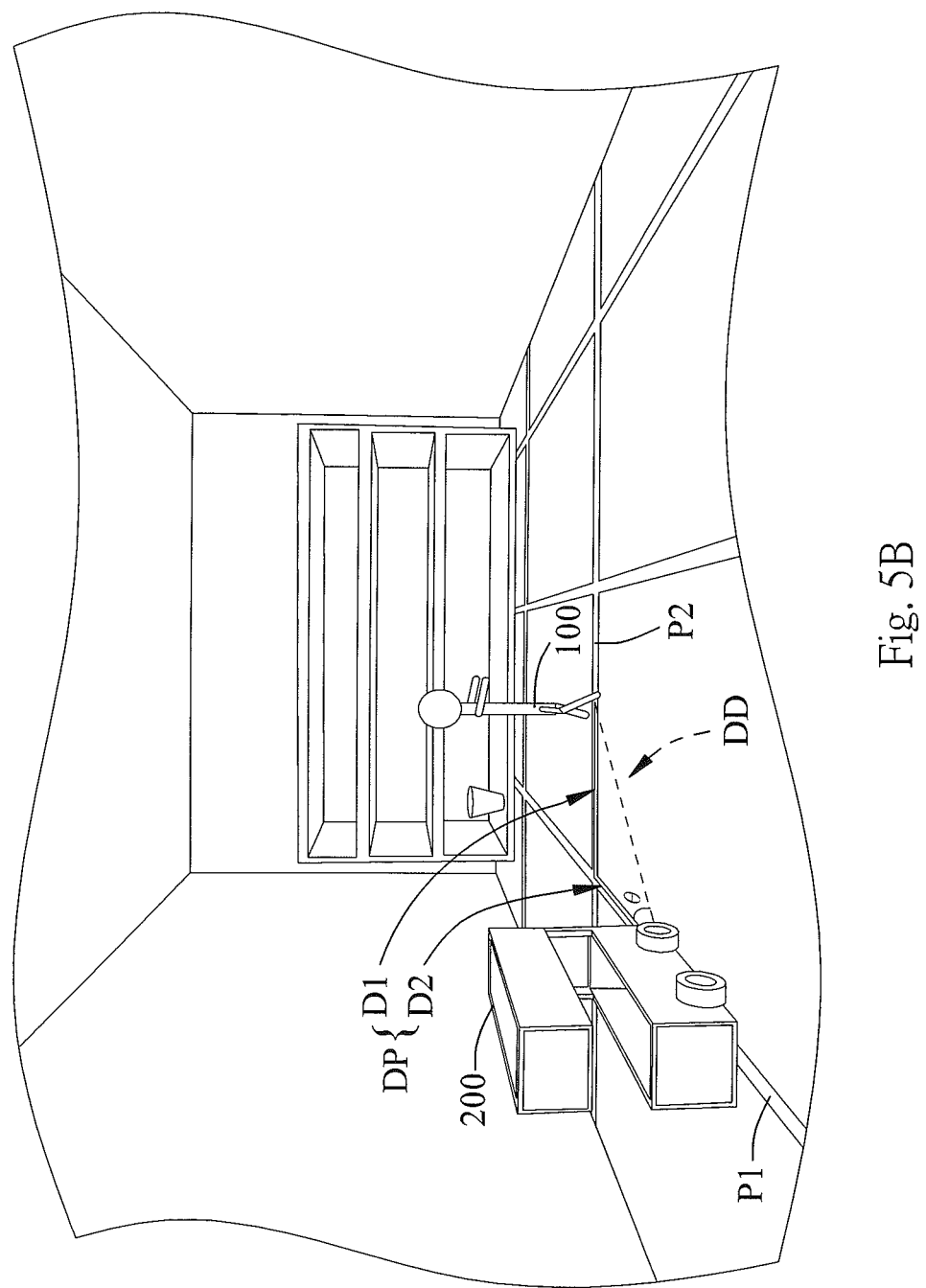
FIG. 5B is a schematic perspective diagram illustrating an environment while practicing the method of FIG. 5A according to an embodiment of the present invention.

According to an embodiment of the present invention, a second predetermined path P2 can also be introduced into the method of the present invention. Referring to FIGS. 5A and 5B, where FIG. 5A is a flow chart illustrating the method for automatically following the preceding object 100 by the autonomous vehicle 200 operating with the second predetermined path P2 according to an embodiment of the present invention, and FIG. 5B is a schematic perspective diagram illustrating an environment while practicing the method of FIG. 5A according to an embodiment of the present invention. In step S510, the second predetermined path P2 is provided, in which the second predetermined path P2 is perpendicularly intersecting the first predetermined path P1. The preceding object 100 and the autonomous vehicle 200 are capable of moving to the second predetermined path P2 from the first predetermined path P1 through the intersection of the first predetermined path P1 and the second predetermined path P2. In the case that the preceding object 100 has moved to the second predetermined path P2 from the first predetermined path P1 (step S520), and the autonomous vehicle 200 still remains on the first predetermined path P1, step S530 will be performed. In such step, a deviation distance D1 of the preceding object 100 deviated from the first predetermined path P1 is obtained from calculation by the central processor 210 of the autonomous vehicle 200. Then, in step S540, the central processor 210 determines whether the deviation distance D1 exceeds a deviation threshold. According to an embodiment of the present invention, the deviation threshold may be a fixed value predetermined with the central processor 210, such as 75 centimeters or so, in order to avoid the central processor 210 to be wrongly determining that the preceding object 100 has made a turn in situations that the preceding object is only wobbling along the first predetermined path P1. When the deviation distance D1 exceeds the deviation threshold, the central processor 210 of the autonomous vehicle 200 determines that the preceding object 100 has made a turn. When the deviation distance D1 does not exceed the deviation threshold, the central processor 210 of the autonomous vehicle 200 determines that the preceding object 100 has not made a turn and will go back to step S530 to keep monitoring the deviation distance D1 of the preceding object 100. In the case that the deviation distance D1 has exceeded the deviation threshold, i.e. the preceding object 100 has already made a turn and started to travel along the second predetermined path P2, step S550 will be performed in order to determine the distance between the autonomous vehicle 200 and the preceding object 100 along both the first predetermined path P1 and the second predetermined path P2, for comparing such distance with the predetermined distance DP to instantly control the moving velocity of the autonomous vehicle 200 under such circumstances. The predetermined distance DP in such case includes a surplus distance D2 from the autonomous vehicle 200 to where the first predetermined path P1 intersects the second predetermined path P2, and the deviation distance D1. The distance between the autonomous vehicle 200 and the preceding object 100 along the first predetermined path P1 and the second predetermined path P2 can be determined by using the equation of: $X*(\cos\theta+\sin\theta)$, where $\theta$ represents the included angle $\theta$ between a first reference line and a second reference line, and X represents the direct distance DD between the autonomous vehicle 200 and the preceding object 100 measured by the distance measuring unit 220. The first reference line is the line connecting the autonomous vehicle 200 and the center of the intersection of the first predetermined path P1 and the second predetermined path P2, and the second reference line is the line connecting the center of such intersection and the preceding object 100. Additionally, in step S560, the direction of the turn of the preceding object 100 can also be determined by the included angle $\theta$ via the central processor 210. When the included angle $\theta$ is a positive value and the deviation distance D1 has become greater than the deviation threshold, the central processor 210 determines that the preceding object 100 has made a right turn (step S561), and the central processor 210 will then drive the autonomous vehicle 200 to make a right turn while reaching the intersection of the first predetermined path P1 and the second predetermined path P2 (step S562). When the included angle $\theta$ is a negative value and the deviation distance D1 has become greater than the deviation threshold, the central processor 210 determines that the preceding object 100 has made a left turn in order to keep following the preceding object 100 along the second predetermined path (step S563), and the central processor 210 will then drive the autonomous vehicle 200 to make a left turn while reaching the intersection of the first predetermined path P1 and the second predetermined path P2 in order to keep following the preceding object 100 along the second predetermined path P2 (step S564).

In alternative embodiments, the central processor 210 of the autonomous vehicle 200 may determine whether the preceding object 100 has made a turn by referring to the included angle $\theta$ while passing through the intersection, in which when the included angle $\theta$ is less than a predetermined angle, the central processor 210 determines that the proceeding object 100 has gone straight. When the included angle $\theta$ is less than the predetermined angle, the central processor 210 determines that the proceeding object 100 has made a turn, and the central processor 210 drives the autonomous vehicle to make the corresponding turn.

Figure 6:
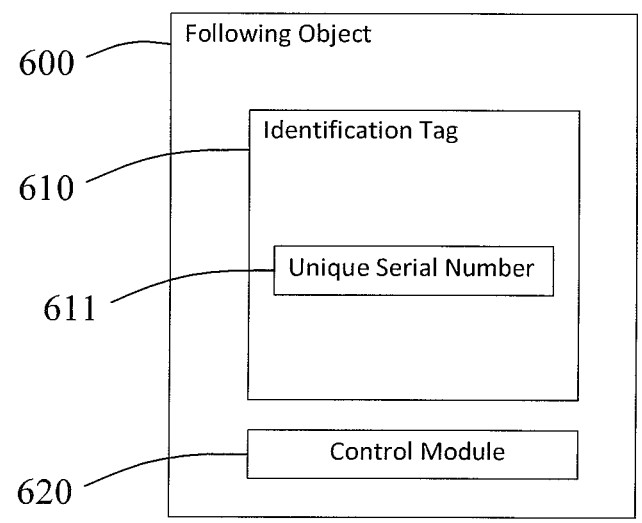
FIG. 6 is a functional block diagram illustrating the following object of a tracking system according to the present invention.
Figure 7:
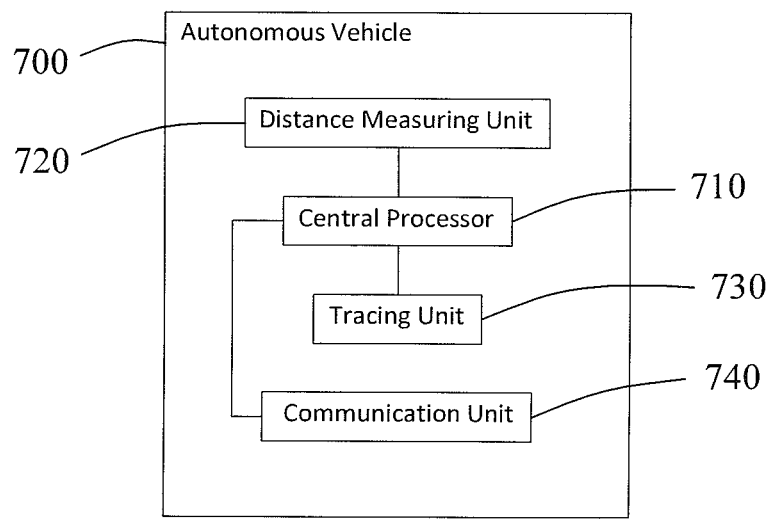
FIG. 7 is a functional block diagram illustrating an autonomous vehicle capable of moving relative to the following object of the tracking system according to an embodiment of the present invention.
Figure 8A:
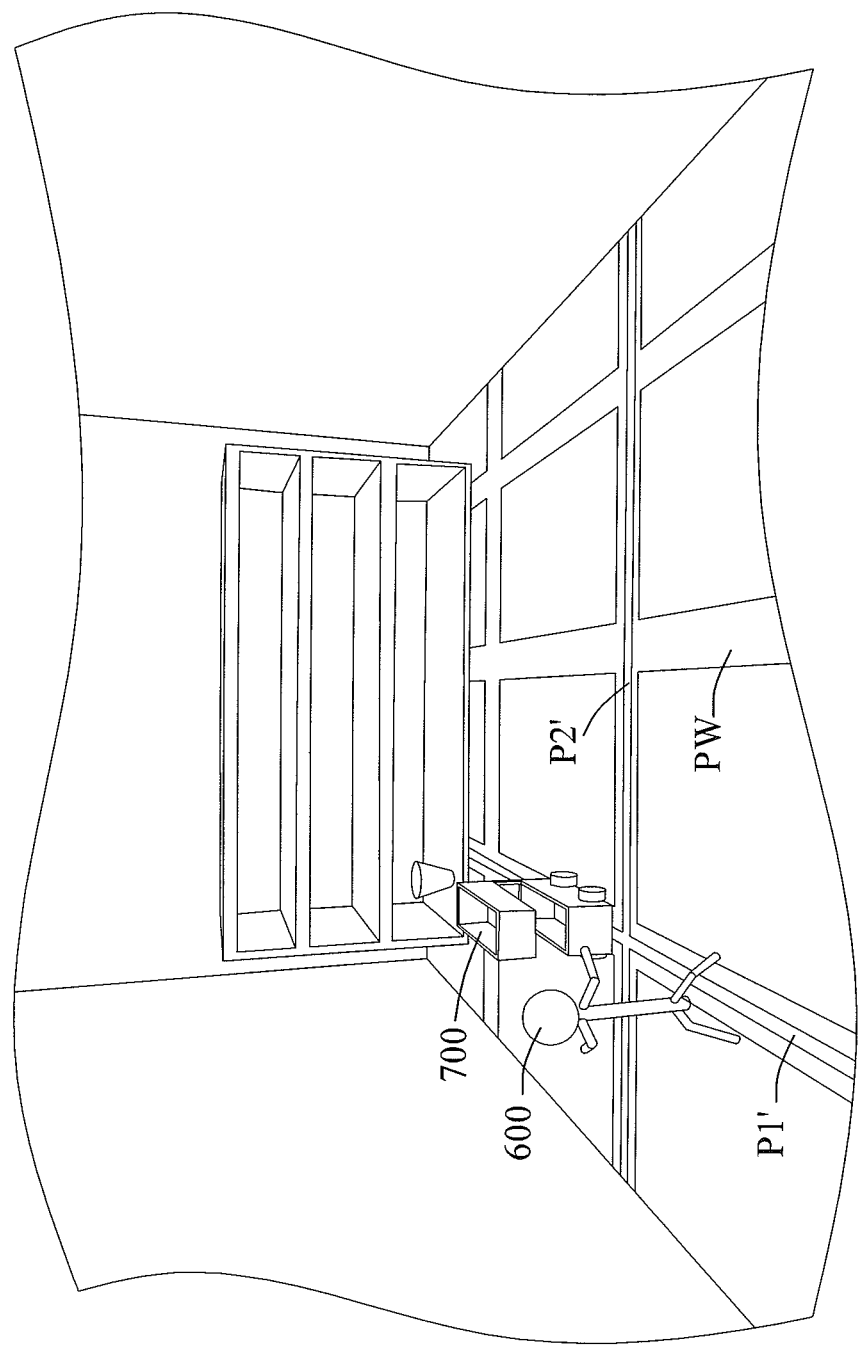
FIG. 8A is a schematic perspective diagram illustrating an environment while practicing tracking system of FIG. 6 and FIG. 7 according to an embodiment of the present invention.
Figure 8B:
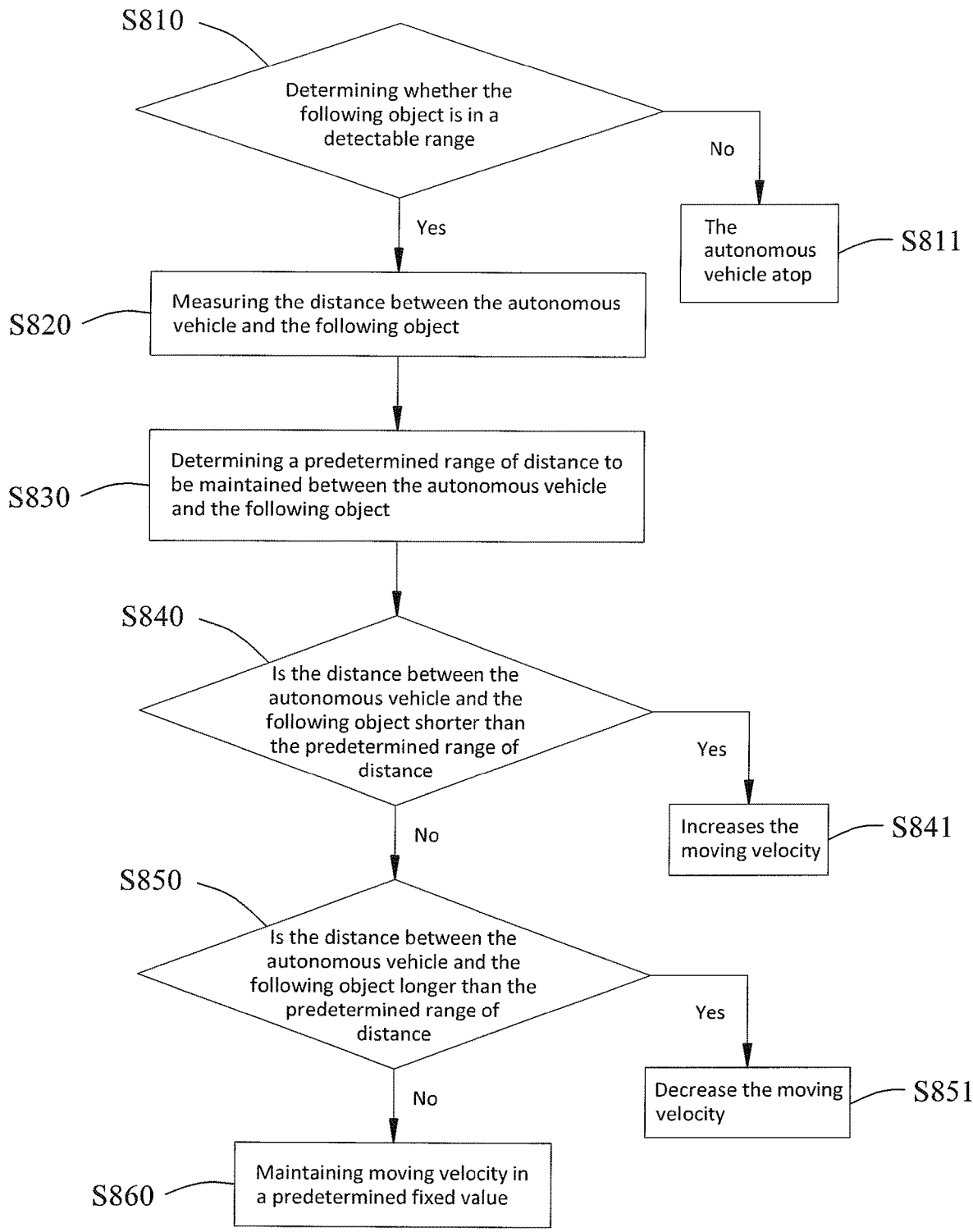
FIG. 8B is a flow chart illustrating a control method of the central processor of the autonomous vehicle.

It is worth mentioning that, the foregoing autonomous vehicle of the aforementioned embodiments illustrating automatic following system can not only be following a preceding object, it is also capable of being followed by a following object. Referring to FIG. 6 to FIG. 7, in which FIG. 6 is a functional block diagram illustrating the following object of a tracking system according to the present invention, and FIG. 7 is a functional block diagram illustrating an autonomous vehicle capable of moving relative to the following object of the tracking system according to an embodiment of the present invention. The autonomous vehicle 700 is equivalent to the autonomous vehicle 200 in the previously illustrated embodiments, and the following object 600 is almost equivalent to the previously mentioned preceding object 100, where the following object 600 has a control module 620 for communicating with the central processor 710 to adjust the traveling path and/or the moving velocity of the preceding autonomous vehicle 700. In some embodiments, the control module 620 can be a remote control and can also be a headset. FIG. 8A is a schematic perspective diagram illustrating an environment while practicing tracking system of FIG. 6 and FIG. 7 according to an embodiment of the present invention, and FIG. 8B is a flow chart illustrating a control method of the central processor 710 of the autonomous vehicle 700. Besides, the autonomous vehicle 700 is configured to travel along a pathway, un which the pathway may be formed of physical markers such as adhesive tapes, painted strips and so on. The instant tracking system initially works while the autonomous vehicle 700 is placed along a first predetermined path P1' located on the pathway, and then the central processor 710 will be activated to perform the controlling method as shown in FIG. 8B. Firstly, in step S810, the central processor 710 determines whether the following object 600 is in a detectable range, and if the following object 600 is undetectable, the autonomous vehicle 700 will stop working within a short period of time (step S811). If the following object is detected, the distance between the autonomous vehicle 700 and the following object 600 will be measured (step S820). Meanwhile, in step S830, a predetermined range of distance is set into the central processor 710, in which the predetermined range of distance is the distance to be maintained between the autonomous vehicle 700 and the following object 600 while the both are moving along the first predetermined path P1'. Next, in step S840, the central processor 710 of the autonomous vehicle 700 determines whether the distance between the autonomous vehicle 700 and the following object 600 is shorter than the predetermined range of distance, if yes, the central processor 710 increases the moving velocity of the autonomous vehicle 700 in order to lengthen the distance between them (step S841). If no, step S850 will be performed, in which the central processor 710 of the autonomous vehicle 700 determines whether the distance between the autonomous vehicle 700 and the following object 600 is greater than the predetermined range of distance, if yes, the central processor 710 decreases the moving velocity of the autonomous vehicle 700 in order to shorten the distance between them both (step S851). If the distance between the autonomous vehicle 700 and the following object 600 falls within the predetermined range of distance, the autonomous vehicle 700 moves with a constant velocity, namely the moving velocity of the autonomous vehicle 700 is traveling with a predetermined fixed value of velocity (step S860).

In this embodiment, the autonomous vehicle 700 travels along the first predetermined path P1' and keeps the distance from the following object 600 within a predetermined value (the predetermined range of distance) to avoid collision. Additionally, the following object 600 may contain the control module 620 working as the remote control telling the central processor 710 that the following object 600 itself intends to change the traveling path from the first predetermined path P1' to another traveling path, which is located on the pathway PW as well, and thereby changing the autonomous vehicle 700 away from the first predetermined path P1' without leaving the pathway PW. For instance, assuming that the autonomous vehicle 700 was planned to go straight along the first predetermined path P1' while reaching a coming intersection with a second predetermined path P2' located on the pathway PW, the following object 600, however, decided to make a turn at that intersection to move the autonomous vehicle 700 to the second predetermined path P2'. Under this scenario, the following object 600 communicates with the autonomous vehicle 700 via the control module 620 telling the autonomous vehicle 700 to make a turn in order to shift its traveling path over to the second predetermined path P2'.

Therefore, the traveling path of the autonomous vehicle 700 will not be limited to be traveling along the first predetermined path P1', but also configured to be moved to other paths located on the pathway PW in order to fulfill various kinds of practical scenarios.

The automatic following system and method of the present invention can be widely applied to, for instance, a warehouse, where workers constantly collect compartments such as pieces of furniture for further purposes such as packaging or shipping. In this case the autonomous vehicle 200 can be operated as a following carrier, so that the workers, namely the preceding object 100 in the present invention, will not have to carry the components by themselves. In another instance, the autonomous vehicle 200 may also be operated as a moving toolbox that follows workers and carry all the materials such as screws, bolts, nails, paints, etc. needed for various types of constructions. Besides, the automatic following system may also be applied to semiconductor industry for carrying precious wafers that are easily damaged if transported manually by human hands, and following the operators to a specific destination in the factory. Hence, the wafers can be transported more safely and the costs of wafer damages caused by human error during transportation among numerous workstations at the manufacturing floor can likely be eliminated.

The description of the invention including its applications and advantages as set forth herein is illustrative and is not intended to threshold the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. For example, specific values given herein are illustrative unless identified as being otherwise, and may be varied as a matter of design consideration. Terms such as "target" and "background" or so are distinguishing terms and are not to be construed to imply an order or a specific part of the whole. These and other variations and modifications of the embodiments disclosed herein, including of the alternatives and equivalents of the various elements of the embodiments, may be made without departing from the scope and spirit of the invention, including the invention as set forth in the following claims.

What is claimed is:

1. A method for automatically following a preceding object by an autonomous vehicle, comprising:
    providing a first predetermined path;
    locating the preceding object and the autonomous vehicle on the first predetermined path, wherein the preceding object includes an identification tag comprising a first serial number and the autonomous vehicle includes a central processor, a communication unit and a distance measuring unit with a camera;
    communicating and recognizing the identification tag of the preceding object by the communication unit;
    measuring a first distance between the autonomous vehicle and the preceding object by the camera disposed on the autonomous vehicle constantly taking images of the preceding object and the central processor calculates a size change of the preceding object captured from the images;

the central processor has determined a threshold distance between the autonomous vehicle and the preceding object;

when the preceding object moves along the first predetermined path, the central processor drives the autonomous vehicle and the camera constantly takes images of the preceding object and the first predetermined path;

when the central processor determines the first distance between the autonomous vehicle and the preceding object captured from the images is shorter than the threshold distance, the autonomous vehicle stops or remains static and when the first distance between the autonomous vehicle and the preceding object is greater than the threshold distance, the central processor drives the autonomous vehicle to increase its moving velocity; and providing a second predetermined path perpendicularly intersecting the first predetermined path, wherein the first predetermined path and the second predetermined path are formed of an adhesive tape, a painted strip or magnetic strip;

wherein when the preceding object moves to the second predetermined path, the first distance is modified to be a second distance, wherein the second distance is deviated from the first distance from a included angle, the central processer has determined a deviation threshold, when the second distance is granter than the deviation threshold, the central processor drives the autonomous vehicle moves to the second predetermined path along with the preceding object, wherein the included angle is an angle between a first reference line and a second reference line, the first reference line is formed by connecting the autonomous vehicle and the center of the intersection, and the second reference line is formed by connecting the center of the intersection and the preceding object.

2. The method as claimed in claim 1, wherein the threshold distance is a range of distance ranging between a first threshold and a second threshold greater than the first threshold, when the first distance between the autonomous vehicle and the preceding object exceeds the second threshold, the autonomous vehicle increases the moving velocity, when the first distance between the autonomous vehicle and the preceding object becomes shorter than the first threshold, the autonomous vehicle decreases the moving velocity to zero, and when the first distance of the autonomous vehicle is between the first threshold and the second threshold, the moving velocity is a predetermined fixed value set in the central processor.

3. The method as claimed in claim 1, wherein a direction of a turn of the preceding object is determined by calculating the included angle by the central processor, when the included angle is a positive value and the deviation distance has become greater than the deviation threshold, the central processor determines that the preceding object has made a right turn, and when the included angle is a negative value and the deviation distance has become greater than the deviation threshold, the central processor determines that the preceding object has made a left turn.

4. The method as claimed in claim 1, wherein when the proceeding object passes through the intersection and the included angle is less than a predetermined angle, the central processor determines that the proceeding object has gone straight through the intersection, and when the proceeding object passes through the intersection and the included angle is greater than the predetermined angle, the central processor determines that the proceeding object has made a turn, and the central processor drives the autonomous vehicle.

* * * * *